[11] 3,587,301

[72] Inventor Henry H. M. Chau
     Livermore, Calif.
[21] Appl. No. 785,173
[22] Filed Dec. 19, 1968
[45] Patented June 28, 1971
[73] Assignee United States of America as represented
     by the United States Atomic Energy
     Commission

[54] HOLOGRAPHIC INTERFEROMETER FOR ISOPACHIC STRESS ANALYSIS
     10 Claims, 2 Drawing Figs.
[52] U.S. Cl. ............................................ 73/88, 350/3.5
[51] Int. Cl. ............................................ G01l 1/24
[50] Field of Search ................................ 73/71.3, 67.5 (H), 88 (O); 350/3.5; 356/32

[56] References Cited
     UNITED STATES PATENTS
     3,434,339  3/1969  Stetson et al. .............. 73/67.6
     3,096,175  7/1963  Zandman ..................... 73/88X OTHER REFERENCES
Tippett et al., Textbook-Optical and Electroptical Information Processing, the M.I.T. Press, Nov. 1965, p. 155 and 156.
Journal of the Optical Society of America, Vol. 56, No. 10, Oct. 1966, p. 1450, Abstract of Powell et al.
Monneret, Optique: Holographie Dynamique, Comptes Rendus, Vol. 264, No. 18, May 1967, p. 1306— 1308.
Brandt, Hologram-Moire Interferometry for Transparent Objects, Applied Optics, Vol. 6, No. 9, Sept. 1967, p. 1535— 1540.

*Primary Examiner*—Richard C. Queisser
*Assistant Examiner*—John P. Beauchamp
*Attorney*—Roland A. Anderson ABSTRACT: A holographic method and apparatus for real-time isopachic (equal optical path) stress analysis of specimen materials having photoelastic stress-optic properties for structural analysis of stressed structures and shapes. The novel holographic interferometer provides a means of detecting and measuring stress zones inside a structure or shape.

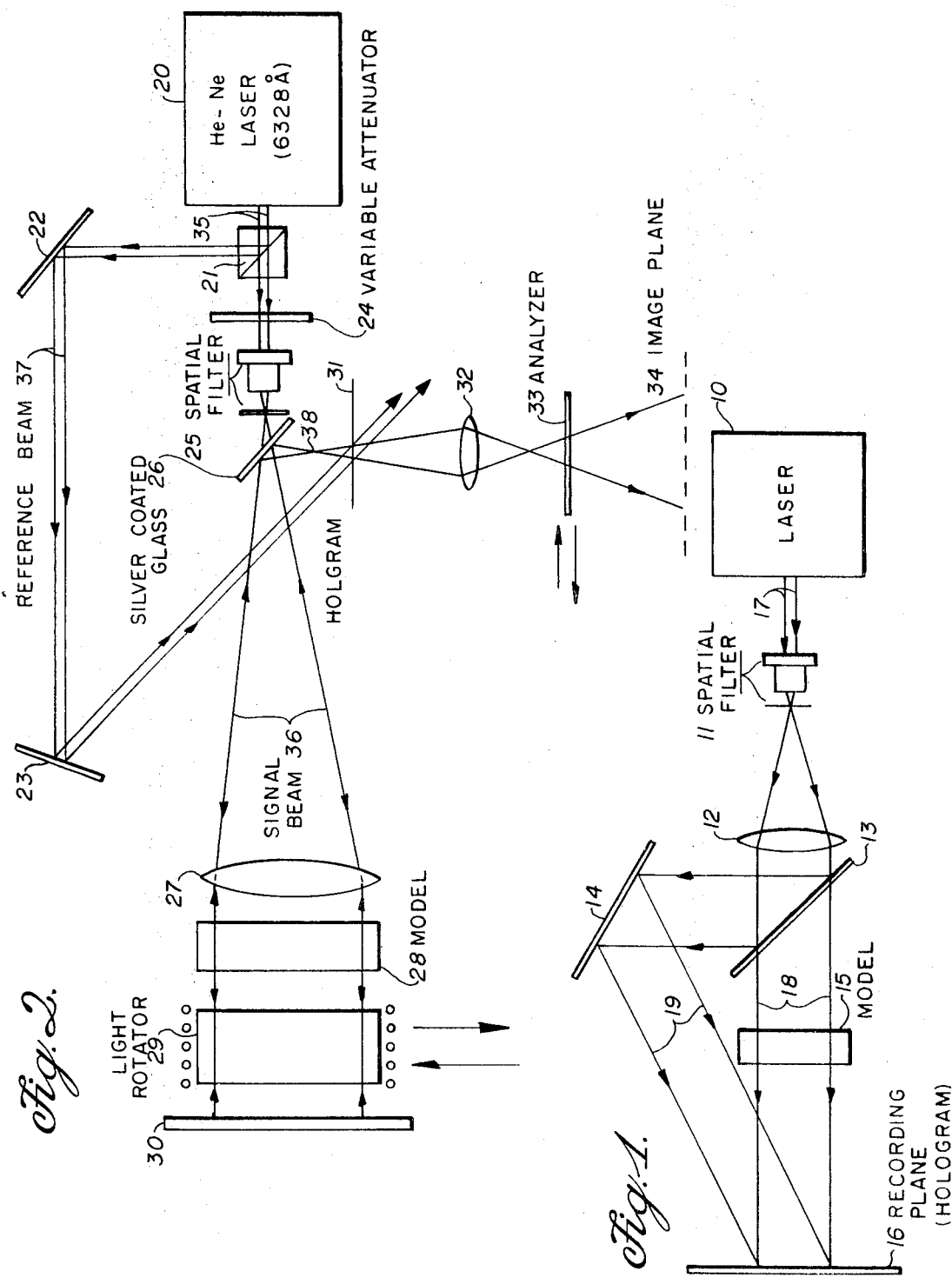

HOLOGRAPHIC INTERFEROMETER FOR ISOPACHIC STRESS ANALYSIS

BACKGROUND OF THE INVENTION

The invention described herein was made in the course of, or under, Contract No. W-7405-ENG-48 with the United States Atomic Energy Commission.

Holographic apparatus and techniques are known in the prior art, as exemplified in the article by M. E. Fourney published in Experimental Mechanics, 8, 33 (1968). However, these prior known approaches do not compensate for stress-optic effects of materials or allow for real-time analysis. Also, holographic stress analysis systems have been previously developed for real-time surface stress analysis but do not provide for detection or measurement of stressed zones inside the specimen material.

SUMMARY OF THE INVENTION

The distinguishing feature of the present holographic technique and interferometer over the prior developed holographic systems is that it is designed for stress analysis of photoelastic materials, which is significant in that stressed zones inside the specimen material are detected and measured. Thus, the holographic interferometer of this invention obtains isopachic (equal optical path) fringe patterns resulting from stressing a photoelastic material; while providing real-time analysis of these isophachic fringe patterns.

Therefore, it is an object of this invention to provide a technique and apparatus for isopachic stress analysis.

A further object of the invention is to provide a holographic interferometer for isopachic (equal optical path) stress analysis.

Another object of the invention is to provide a holographic interferometer for obtaining isopachic fringe patterns resulting from stressing a photoelastic material.

Another object of the invention is to provide a holographic interferometer which compensates for stress-optic effects of material and allows for real-time analysis.

Another object of the invention is to provide a holographic interferometer for stress analysis of photoelastic materials, whereby stressed zones inside the specimen material are detected and measured.

Other objects of the invention, not specifically set forth above, will become readily apparent from the following description and accompanying drawings.

BRIEF DESCRIPTION OF THE DRAWINGS

FIG. 1 is a schematic diagram of a prior known off-axis holographic setup used to obtain isopachic patterns of a certain transparent plane model under plane stress; and FIG. 2 is a schematic diagram of the holographic interferometer for universal isopachic study in accordance with the present invention.

DESCRIPTION OF THE INVENTION

For the purpose of providing a basic understanding prior to the detailed description of the invention, application of holography to photoelasticity is briefly discussed hereinafter, with emphasis on its potential in isopachic stress analysis. To more clearly illustrate the invention, conventional two-beam interferometry is described with respect to FIG. 1, utilized in the prior efforts for surface-deformation and stress analysis by holography. Comparison of the wavefront reconstruction image with its original three-dimension object, as produced by the inventive apparatus of FIG. 2, provides a unique contribution of holographic technique to this field which, otherwise, as in the past, is impossible with classical or prior known interferometry. By employing a photochromic recording medium in accordance with the present invention, the technique of real-time interference becomes a practical and convenient process.

Photoelasticity is a very well established field of stress analysis. Information for this study is obtained principally from three types of interference patterns, using appropriate polariscopes. These are: (1) isoclinic fringes from the plane polariscope show the directions of the principle stresses, P and Q, of an object subjected to plane stress; (2) isochromatic fringes from the circular polariscope represent the loci of constant difference between the principle stresses (P—Q); and (3) isopachic fringes from lateral extensometer or interferometer give the loci of constant sum of the principal stresses (P+Q). Of the three patterns, the first two are rather easy to obtain so far as the optical arrangements are concerned. However, the last one (isopachic) is quite complex. Elaborate optical interferometers such as Michelson and Mach-Zehnder types or the modifications of them have been commonly used in the prior art to obtain isopachic patterns. These prior known instruments require critical alignments between their two arms in order to attain zero fringe condition for uniform background. Besides, an identical model compensator is often needed to match up between the interference beams. In view of these factors, the introduction of holography to photoelasticity has taken place as illustrated in FIG. 1, with the unique technique of the present invention, illustrated in FIG. 2 serving to greatly advance the state-of-the-art in this field.

Undoubtedly, isoclinics and isochromatics can easily be obtained by adding a suitable polarizer, analyzer and/or quarter-wave plates into a standard holographic setup of the FIG. 1 type. However, no apparent advantage will be gained by so doing, because it does not simplify the conventional process or increase its sensitivity. In this respect, the prior known two-step technique of holography is no match at all for the simpler one-step classical polariscopes (plane and circular) which are much more convenient to operate and the results are superior. Accordingly, application of holography in this area provides merely an alternative.

A simple standard off-axis holographic setup as shown in FIG. 1 can be sued to obtain isopachic patterns of a certain transparent plane model under plane stress, as reported in the above-cited article published in Experimental Mechanics and which utilized a double-exposure method. As shown in FIG. 1, this conventional setup consists of laser 10, spatial filter assembly generally indicated at 11, collimating lens 12, beam splitter 13, mirror 14, model (material being tested) 15 and recording plane or hologram 16. As indicated by the arrows, a beam of light indicated at 17 emitted from laser 10 is transmitted through filter assembly 11 and collimating lens 12 to the beam splitter 13 where it is split and one portion constituting an image light beam generally indicated at 18 is directed through the model 15 and imposed on the hologram 16, the other portion of the beam constituting a reference light beam generally indicated at 19 is reflected by mirror 14 onto hologram 16, as described hereinafter.

First, a hologram is taken of the model or specimen 15 in its unloaded or unstressed state. Then, a second hologram is recorded on top of the previous one when the load or stress is applied to the model or specimen 15. Upon reconstruction of the hologram, the two reconstructed images will interfere. Such interference fringes indicate changes of optical path length caused by the load or stress on the model. By the elastic law, the change of optical path (or optical retardation) of the light beam passing through a model under stress is directly related to the sum of the principle stresses:

$$\delta S = \mu(\delta t) = \mu[-(P+Q)\nu t/E]$$

where $\mu$ is the index of refraction of the unstressed model, $\delta t$ is the change of the thickness of the model under stress, P and Q are the principal stresses, $\nu$ is the Poisson's ratio, $t$ is the unstressed thickness, and E is the modulus of elasticity, the equation being referred to hereinafter as equation [1]. Thus, the dark fringes in an isopachic pattern obtained by the FIG. 1 method correspond to points where $\delta S$ is equal to the odd multiples of half-wavelengths, $\lambda/2$, $3\lambda/2$, ... etc. Regions of constant sum of the principal stresses (P+Q) are then the isopachic lines themselves.

A very important point should be noted in the foregoing prior art scheme illustrated by FIG. 1. The stress-optical effect, i.e., the change of refractive indices of the model or specimen under stress, is entirely ignored. This assumption is justified only if the material of the test model has a negligibly low stress-optical sensitivity. For instance, lucite or plexiglas, as used in the above-referenced Fourney experiment, has a relatively low stress-optical sensitivity (a ratio of 1 to 168). Therefore, no serious error would be introduced by using a model of such material in the simple holographic arrangement of FIG. 1 to obtain its (P+Q) distributions. However, in general, most of the materials in photoelastic research such as Bakelite, Catalin 800 and gelatin are highly stress-optically sensitive, and the prior known holographic setup, such as the FIG. 1 arrangement cannot be satisfactorily applied thereto.

The inventive holographic interferometer illustrated in FIG. 2 and described hereinafter provides universal isopachic study. Its optical arrangement is a combination of a reflection polariscope and other instrumentation blended with holography.

Referring now to FIG. 2, the embodiment illustrated therein comprises a laser 20, for example, a He-Ne laser of wavelength 6328 A., a beam splitter 21, a first mirror 22, a second mirror 23, a variable attenuator 24, spatial filter assembly 25, a sheet of silver-coated glass 26, collimating lens 27, model or test object 28, light rotator 29, a third mirror 30, photochromic sheet of hologram 31, imaging lens 32, analyzer 33, and image plane 34. The light beam from laser 20 indicated at 35 is split into a signal or scene beam generally indicated at 36 and a reference beam generally indicated at 37. The return or reflected signal beam reflected by the silver-coated glass 26 is indicated at 38.

Following the usual holographic scheme, the plane polarized laser beam 35 with high degree of coherence is amplitude-split via elements 21 and 24. After being cleaned by passing through spatial filter assembly 25, one beam 36 is spread out, collimated by lens 27, and directed through test model 28. This so-called signal or scene beam 36 will eventually be reflected back into the system by mirror 30 and will intersect with the reference beam 37 at the recording plane containing photochromic sheet 31, where a hologram is taken; the reference beam 37 being reflected onto sheet 31 by mirrors 22 and 23 with the beam 36 being reflected back through test object or model 28 and collimating lens 27 and reflected toward the recording plane by the silver-coated glass plate 26. The function of the light rotator 29 and analyzer 33 will be explained below. Note that the reference beam 37 of the FIG. 2 apparatus is used only for hologram construction and reconstruction, and that it is not the reference or comparison beam as commonly called in the classical two-beam interferometry. The comparison beam for interference in the present invention (FIG. 2) is actually stored in the hologram or photochromic sheet 31, which will be drawn out in the reconstruction process.

First, a hologram is taken of an unloaded or unstressed model 28 in the position as depicted in FIG. 2. The recording medium utilized is the photochromic sheet 31 instead of a photographic plate or film. The transparent photochromic material is responsive to different wavelengths of light, that darken or bleach under different wavelengths, and as used in the experiments conducted the material has a property that is darkened by ultraviolet (UV) light and is bleached or lightened by an He-Ne laser of wavelength 6328 A., as described above regarding laser 20. The reasons for choosing this recording material are: (1) high resolution and low scattering of light, because it contains no grains; (2) convenience, because no chemical developing process is involved, and so the difficulty or repositioning an after-exposure hologram does not exist; (3) high reusability, because the same piece of photochromic sheet can be used repeatedly for about 50 times.

With such a useful recording material, convenient real-time interference is easily performed. When the first hologram is recorded by means of bleaching the predarkened photochromic sheet 31 with the He-Ne laser 20 via the apparatus of FIG. 2, the hologram is right there immediately and precisely aligned in position. At this stage, no attempt is made to record a second hologram (double-exposure) of the model 28 subjected to stress. It is conspicuous that as soon as a hologram is recorded on the photochromic sheet 31, reconstruction is taking place simultaneously by the same reference beam 37. This process will continue until the hologram on the photochromic sheet is entirely bleached off. The time interval for this process certainly depends on the intensity of the reference beam 37. In experiments conducted, measurement showed that it is of the order of a few minutes. Within this time interval, if stress is applied to the model 28, then the light beam 38 reflected from or through it, by mirror 30 and/or the silver-coated glass 26, will interfere with the reconstruction caused by the reference beam 37 because beams 37 and 38 are automatically aligned and superimposed upon each other in the hologram. This real-time interference can be viewed and/or photographed on the image plane 34 having passed through imaging lens 32. For better contrast of the interference pattern, the variable attenuator 24 is provided which can be adjusted to any desirable intensity level of the signal beam 36 and thus the return or reflected signal or beam 38. In this manner a changing interference pattern caused by variation of the applied stress can be seen continuously which, otherwise, cannot be obtained in the double-exposure hologram of the prior known processes.

The holographic interferometer of this invention will handle test models of different kinds of material, the description of each case being presented below.

It will handle transparent materials of low photoelastic sensitivity such as plexiglas; and metals with reflecting surface such as steel. Consideration here is only on the elastic law set forth above. The change of indices of refraction resulting from birefringent effect is negligible. The signal beam 36—38 after reflection from the stressed metallic surface or double transmission through the stressed transparent material, will still have the same polarization as the reference beam 37. Therefore, the light rotator 29 need not be energized and the analyzer 33 can be removed. The rest of the operation of obtaining isopachic patterns is straightforward, as described previously.

The novel interferometer will handle transparent materials of relatively high stress-optical sensitivity such as bakelite. In addition to the change of thickness (the elastic law as expressed in equation [1] above), a model under stress also suffers change of index of refraction in the directions of the principal stresses P and Q (the stress-optical law). To investigate this, let E be the plane-polarized light vector which will pass through a point where the principle stresses are P and Q of the model under plane stress. At this point, E resolves into two plane-polarized components $p$ and $q$ which are parallel to P and Q, respectively. In accordance with the stress-optical law, the respective indices of refraction are:

$$\mu_P = \mu + C_1 P + C_2 Q$$

$$\mu_Q = \mu + C_1 Q + C_2 P$$

where $C_1$ and $C_2$ are constants and $\mu$ is the index of refraction of the unstressed model, these equations being referred to hereinafter as equation [2]. Optical retardations (changes of the optical path length) of beams $p$ and $a$ due to these causes are:

$$\delta S_P = \mu_P(t + \delta t) - \mu t$$

$$\delta S_Q = \mu_Q(t + \delta t) - \mu t$$

where $\delta t$ is the change of thickness of the plate according to the elastic law as defined by equation [1] above, these equations being hereinafter referred to as equation [3].

After traversing the stressed model, both the $p$ and $q$ beams pass into the energized magneto-optical light rotator 29, a device employing Faraday's effect and well-known in the art. The rotator 29 is so adjusted that the light vector will rotate 45° upon a single pass through it. As a result, beams $p$ and $q$ traversing the rotator 29 and reflecting back by mirror 30 through rotator 29 rotate an additional 45° and emerge at 90° to their polarization.

Upon passing through the stressed model again, the roles of $p$ and $q$ are interchanged. The $p$ beams suffers the retardation $\delta S_Q$, while the $q$ suffers the retardation $\delta S_P$, set forth by equation [3]. Finally, upon emerging from the model, both $p$ and $q$ then have the same retardation:

$$\delta S = \delta S_P + \delta S_q = (C_1 + C_2 - 2\mu v/E) \, t(P+Q)$$

where $\mu$, $v$, and E are constants as defined in equation [1], this being referred to as equation [4]. This means that beams $p$ and $q$ are in phase. So they combine again into a plane-polarized light vector E' which is at right angles to the original incident light vector E. Recall that the reference beam in the system has the same polarization as E and so does the comparison beam reconstructed from the hologram by the same reference. There will be no interference between E' and the comparison beam because they are at opposite polarizations. Under this circumstance, an analyzer 33 is required to obtain isopachic interference patterns.

Equation [4] above shows again the direct relationship of the sum of principal stresses (P+Q) and the optical retardation $\delta S$. Dark fringes appear at the area where $\delta S$ is equal to the odd multiples of half-wavelengths, $\lambda/2$, $3\lambda/2$ ... etc. The isopachic fringe constant $(C_1+C_2 2\mu v/E)\, t$ may be found directly by a simple tension or bending test of the material cut from the same sheet as the model itself.

For sample testing of the inventive apparatus illustrated in FIG. 2, lucite model 3.175 mm. thick were used. They were subjected to compression stress, and isopachic patterns thus obtained which illustrated the isopachic fringe lines. These patterns are useful to give the loci of constant sum of the principal stresses on the specimen.

It has thus been shown that isopachic patterns can be obtained easily and conveniently in the holographic interferometer described herein. The inventive technique of holography has removed one arm of the classic two-beam interferometry; and consequently, the critical alignment of optics in the instrument is eliminated. Utilization of the photochromic recording medium make the real-time interference a simple and practical technique. For transparent models, the double path scheme in the reflection interferometer will increase the sensitivity twice as much. Thus, the holographic technique of this invention serves to greatly advance the art of photoelasticity.

I claim:

1. In a holographic method for real-time isopachic stress analysis of a structure component, the steps comprising: producing a test specimen of a photoelastic material having a shape geometrically similar to that of a desired structural component; directing a light beam from a source through beam-splitting means producing a light image beam and a reference light beam; recording a holograph of the specimen in an unstressed condition on a transparent photochromic medium by directing the light image beam through spatial filter means, a silver-coated glass assembly, collimating means and the specimen, and reflecting the light image beam of the specimen back through the specimen and collimating means, and further reflecting the light image beam by the silver-coated glass assembly onto the transparent photochromic medium; applying stress to the specimen; directing a light image beam of the specimen under stress through the transparent photochromic medium; directing simultaneously a reference light beam through the transparent photochromic medium to give a reconstructed light image beam of the specimen in stressed condition; recording simultaneously an optical interference pattern resulting from optical interference of the superimposed light image and reference beams; and analyzing the interference pattern to determine stress and deformation parameters.

2. The holographic method defined in claim 1, additionally including the step of directing the light image beam of the specimen having a relatively high stress-optical sensitivity through a light rotator mechanism for rotating the plane components of the light image beam prior to the step of directing the light image beam of the specimen through the transparent photochromic medium.

3. The holographic method defined in claim 2, additionally including the step of directing the interference pattern on the transparent photochromic medium through an analyzer mechanism because of polarizations of the light image beam of the specimen and the reference light beam caused by the light image beam passing through the light rotator mechanism.

4. The holographic method defined in claim 1, additionally including the step of directing the light image beam through a variable attenuator mechanism prior to same being directed to the specimen to adjust the intensity level of the light image beam and thereby produce better contrast of the interference pattern.

5. A holographic interferometer for isopachic stress analysis comprising: a light source; means for splitting a beam of light from said light source into a signal light beam and a reference light beam; a spatial filter assembly positioned to receive said signal light beam from said beam splitting means; a silver-coated glass assembly aligned with said spatial filter assembly and adapted to pass said signal light beam therethrough in one direction and reflect same from the opposite direction; collimating means adapted to receive said signal light beam passed through said glass assembly and direct same through an associated specimen to be tested; reflector means for directing said signal light beam from an associated specimen back through such an associated specimen, through said collimating means onto said silver-coated glass assembly for reflection thereby through positioned photochromic material for producing a hologram thereof; said reference light beam from said beam splitting means being directed by reflecting means onto said photochromic material such that said signal light beam and said reference light beam are superimposed upon one another and producing an interference pattern when an associated specimen is placed under stress due to optical interference of said light beams.

6. The holographic interferometer defined in claim 5, wherein said light source is a laser.

7. The holographic interferometer defined in claim 6, wherein said laser is of an He-Ne type of wavelength 6328 A. and wherein said photochromic material has a property that is darkened by ultraviolet light and bleached by the laser wavelength.

8. The holographic interferometer defined in claim 5, additionally includes light rotator means positioned in spaced relationship between said collimating means and said reflector means and on the opposite side of an associated specimen from said collimating means, and analyzer means positioned to obtain the isopachic interference patterns from said photochromic material due to opposite polarization of said signal light beam when directed through said light rotator means.

9. The holographic interferometer defined in claim 5, additionally including a variable attenuator positioned between said beam splitting means and said spatial filter assembly to adjust the intensity level of said light beam for better contrast of the interference pattern formed on said photochromic material.

10. The holographic interferometer defined in claim 5, additionally including an image lens for directing the interference pattern on said photochromic material to an image plane where said interference pattern can be viewed and photographed.